(12) United States Patent
Vesterinen et al.

(10) Patent No.: US 10,993,102 B2
(45) Date of Patent: Apr. 27, 2021

(54) LOCALIZED ROUTING IN MOBILE NETWORKS

(71) Applicant: Nokia Technologies Oy, Espoo (FI)

(72) Inventors: Seppo Vesterinen, Espoo (FI); Matti Laitila, Espoo (FI); Samuli Turtinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 154 days.

(21) Appl. No.: 15/746,189

(22) PCT Filed: Jul. 21, 2015

(86) PCT No.: PCT/US2015/041374
§ 371 (c)(1),
(2) Date: Jan. 19, 2018

(87) PCT Pub. No.: WO2017/014759
PCT Pub. Date: Jan. 26, 2017

(65) Prior Publication Data
US 2018/0213390 A1 Jul. 26, 2018

(51) Int. Cl.
*H04W 8/08* (2009.01)
*H04W 36/00* (2009.01)
(Continued)

(52) U.S. Cl.
CPC ........ *H04W 8/082* (2013.01); *H04W 36/0011* (2013.01); *H04W 40/34* (2013.01); *H04W 88/16* (2013.01)

(58) Field of Classification Search
CPC .. H04W 8/082; H04W 36/0011; H04W 40/34
See application file for complete search history.

(56) References Cited

U.S. PATENT DOCUMENTS

2007/0232301 A1* 10/2007 Kueh .................... H04W 8/082
455/433
2009/0232019 A1* 9/2009 Gupta ................. H04L 12/2876
370/252

(Continued)

OTHER PUBLICATIONS

Korhonen, Jouni, Teemu Savolainen, and S. Gundavelli, "Local prefix lifetime management for proxy mobile IPv6," Internet Engineering Task Force, IETF, 2012.
(Continued)

*Primary Examiner* — Jael M Ulysse
(74) *Attorney, Agent, or Firm* — Mintz Levin Cohn Ferris Glovsky and Popeo, P.C.

(57) ABSTRACT

Methods and apparatus, including computer program products, are provided for localized routing. In some example embodiments, there is provided a method. The method may include receiving, by a target base station, localized routing context information for a user equipment, wherein the localized routing context is received from at least one of a user gateway or a controlling mobility gateway; and sending, by the target base station, updated localized routing context information to at least one other base station, wherein the updated localized routing context information is sent via a local interface between the target base station and the at least one other base station. Related apparatus, systems, methods, and articles are also described.

40 Claims, 11 Drawing Sheets

(51) Int. Cl.
*H04W 40/34* (2009.01)
*H04W 88/16* (2009.01)

(56) References Cited

U.S. PATENT DOCUMENTS

| | | | | |
|---|---|---|---|---|
| 2009/0303966 | A1* | 12/2009 | Cherian | H04W 36/0016 370/331 |
| 2010/0195621 | A1* | 8/2010 | Kekki | H04W 48/17 370/332 |
| 2010/0208658 | A1* | 8/2010 | Vesterinen | H04W 8/082 370/328 |
| 2011/0002297 | A1* | 1/2011 | Jain | H04W 36/06 370/331 |
| 2011/0003595 | A1* | 1/2011 | Shan | H04W 36/0066 455/436 |
| 2011/0075675 | A1* | 3/2011 | Koodli | H04L 12/14 370/401 |
| 2011/0103260 | A1* | 5/2011 | Jeyatharan | H04W 60/005 370/254 |
| 2011/0134869 | A1* | 6/2011 | Hirano | H04L 29/12311 370/329 |
| 2011/0194535 | A1* | 8/2011 | Johansson | H04W 28/24 370/331 |
| 2011/0235595 | A1* | 9/2011 | Mehta | H04W 8/082 370/329 |
| 2011/0261787 | A1* | 10/2011 | Bachmann | H04L 63/029 370/331 |
| 2012/0002643 | A1* | 1/2012 | Chung | H04J 11/0093 370/331 |
| 2012/0046058 | A1* | 2/2012 | Vesterinen | H04W 8/082 455/509 |
| 2012/0076121 | A1* | 3/2012 | Choi | H04W 36/08 370/338 |
| 2012/0218970 | A1* | 8/2012 | Westberg | H04W 36/026 370/331 |
| 2012/0218974 | A1* | 8/2012 | Zhou | H04L 69/161 370/331 |
| 2012/0314690 | A1* | 12/2012 | Xu | H04W 36/02 370/331 |
| 2012/0320827 | A1* | 12/2012 | Zhao | H04W 76/20 370/328 |
| 2013/0051327 | A1* | 2/2013 | Kim | H04W 8/082 370/328 |
| 2013/0070596 | A1* | 3/2013 | Yeh | H04W 36/0038 370/235 |
| 2013/0287012 | A1* | 10/2013 | Pragada | H04W 76/25 370/338 |
| 2013/0308527 | A1* | 11/2013 | Chin | H04W 36/0022 370/328 |
| 2014/0010204 | A1* | 1/2014 | Xu | H04W 36/0033 370/331 |
| 2014/0029436 | A1* | 1/2014 | Boc | H04W 8/082 370/236 |
| 2014/0179325 | A1* | 6/2014 | Xu | H04W 36/08 455/437 |
| 2014/0219248 | A1* | 8/2014 | Reddiboyana | H04W 76/15 370/331 |
| 2014/0321328 | A1* | 10/2014 | Zuniga | H04W 8/06 370/254 |
| 2015/0065106 | A1* | 3/2015 | Catovic | H04W 88/06 455/418 |
| 2015/0103766 | A1* | 4/2015 | Miklos | H04W 76/20 370/329 |
| 2015/0110070 | A1* | 4/2015 | Liu | H04W 80/045 370/331 |
| 2016/0007243 | A1* | 1/2016 | Park | H04W 36/0058 370/331 |
| 2016/0135219 | A1* | 5/2016 | Jain | H04W 40/06 370/329 |

OTHER PUBLICATIONS

Krishnan, S., et al., "Localized routing for proxy mobile IPv6," No. RFC 6705. 2012.
Wu, Q. "An extension to proxy mobile IPv6 for local routing optimization." draft-wu-netext-local-ro-05. txt (2010).

* cited by examiner

LOCALIZED ROUTING IN MOBILE NETWORKS

This application is a national-phase entry of Patent Cooperation Treaty Application No. PCT/US2015/041374, entitled "LOCALIZED ROUTING IN MOBILE NETWORKS," which has an international filing date of Jul. 21, 2015, the contents of which is hereby incorporated by reference in its entirety.

FIELD

The subject matter disclosed herein relates to wireless devices and networks.

BACKGROUND

Today's cellular networks enable mobility by providing a centralized core including home agents, border Internet Protocol (IP) gateways, mobility anchors, and/or other devices. For example, the GPRS Tunneling Protocol (GTP) and the Proxy Mobile IPv6 (PMIPv6) can be used to provide tunnel switched mobility in mobile networks and, in particular, the Evolved Packet Core (EPC). This centralized gateway approach may provide a central anchor that follows a user equipment as it moves by re-routing the packets over tunnels from the mobility anchor to a terminating base station (eNB) serving the user equipment. In this way, the user equipment may be mobile and handed over from base station to base station in a seamless manner.

SUMMARY

Methods and apparatus, including computer program products, are provided for localized routing.

In some example embodiments, there is provided a method. The method may include receiving, by a target base station, localized routing context information for a user equipment, wherein the localized routing context is received from at least one of a user gateway or a controlling mobility gateway; and sending, by the target base station, updated localized routing context information to at least one other base station, wherein the updated localized routing context information is sent via a local interface between the target base station and the at least one other base station.

In some example embodiments, one of more variations may be made as well as described in the detailed description below and/or as described in the following features. The target base station may send an indication that localized routing is enabled at the target base station. The localized routing context information context may be received in response to the indication. The target base station may send a context release message to a source base station that served the user equipment before a handover from the target base station to a source base station, wherein the context release is sent via a local interface between the target base station and the source base station. The target base station may include a local gateway coupled to the user gateway. The local gateway may provide a local mobility agent and/or a mobile access gateway. The local gateway may be configured in accordance with proxy mobile internet protocol version six. The user gateway may collect local routing entries for the user equipment. The sent updated localized routing context information may configure the at least one other base station with user equipment context data and/or target base station context data. An acknowledgement message may be sent representative that the at least one other base station includes updated localized routing context information for the user equipment. The localized routing provided by the target base station may be configured based on the received context information. The mobility access gateway may be configured to provide mobility and localized routing in accordance with a proxy mobile internet protocol version six. The target base station may send a proxy binding update message to at least one of a controlling mobility gateway or a user gateway. The target base station may receive a proxy binding acknowledgement message including a local routing initialization message for the at least one user equipment. The proxy binding acknowledgement may be user equipment specific. The target base station may send a localized routing acknowledgement message to at least one of a controlling mobility gateway or a user gateway.

In some example embodiments, there may be provided a method including receiving, at a controlling mobility gateway, an indication that localized routing is enabled for at least one base station serving at least one user equipment; determining, at the controlling mobility gateway, whether to allow the localized routing; and initializing, by the controlling mobility gateway, the localized routing at the at least one base station serving.

In some example embodiments, one of more variations may be made as well as described in the detailed description below and/or as described in the following features. The initializing may be performed via an interface between the at least one base station and the controlling mobility gateway. The initializing may include providing localized routing context information, wherein the localized routing context information includes at least one address for the at least one base station and/or the at least one user equipment. The indication may be received from a user gateway coupled to the controlling mobility gateway and the at least one base station. The at least one user equipment may include a plurality of user equipment routed locally at the at least one base station. The controlling mobility gateway may be a controlling entity for the at least one user equipment. The controlling entity may control access, quality of service, mobility, and/or localized routing. The controlling entity may control with a granularity of per user equipment being served, a location, and/or consumed service. The controlling mobility gateway may configure the localized routing in a user gateway including a local mobility agent. The controlling mobility gateway may check mobility event messages to determine whether to configure and/or re-configure the localized routing in the user gateway. The mobility event messages may be received from the user gateway.

In some example embodiments, there may be provided a method including detecting, at a user gateway, whether localized routing is enabled for at least one base station serving at least one user equipment; determining, at the user gateway, whether to allow the localized routing for the at least one base station serving the at least one user equipment; and initializing, by the user gateway, the localized routing at the at least one base station.

In some example embodiments, one of more variations may be made as well as described in the detailed description below and/or as described in the following features. The initializing may be performed via an interface between the at least one base station and the user gateway. The initializing may include providing localized routing context information, wherein the localized routing context information includes at least one address for the at least one base station and/or the at least one user equipment. The user gateway may include a local mobility agent. The local mobility agent may be configured to provide mobility and the localized routing in accordance with a proxy mobile internet protocol version six. The proxy mobile internet protocol version six may include a service flow and/or a session identifier to enable local routing on a per user service flow and/or session basis. The user gateway may detect a localized routing event. The user gateway may send a notification to the controlling gateway, wherein the notification includes the detected localized routing event. The user gateway may manage the localized routing in the at least one base station. The user gateway may manage, based on information provided by a controlling mobility gateway, the localized routing in a mobility access gateway function of the at least one base station. The user gateway may check whether the localized routing is enabled or disabled at the at least one user equipment, when a proxy binding update message is received from the at least one base station. The user gateway may check for existing localized routing entries with other user equipment, when a proxy binding update message is received from the at least one base station. The user gateway may determine whether to enable localized routing based on a first check for whether the localized routing is enabled and/or a second check for existing localized routing entries. The user gateway may send a proxy binding acknowledgement message to the at one base station, wherein the proxy binding acknowledgement message includes a local routing initialization message for the at least one user equipment. The proxy binding acknowledgement message may be user equipment specific. The proxy binding acknowledgement message may be sent in response to a proxy binding update message being received at the user gateway. The proxy binding update message may include an indication that localized routing is enabled. The user gateway may resend a localized routing initialization message to the at least one base station, when the localized routing acknowledgement message is not received from the at least one base station.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
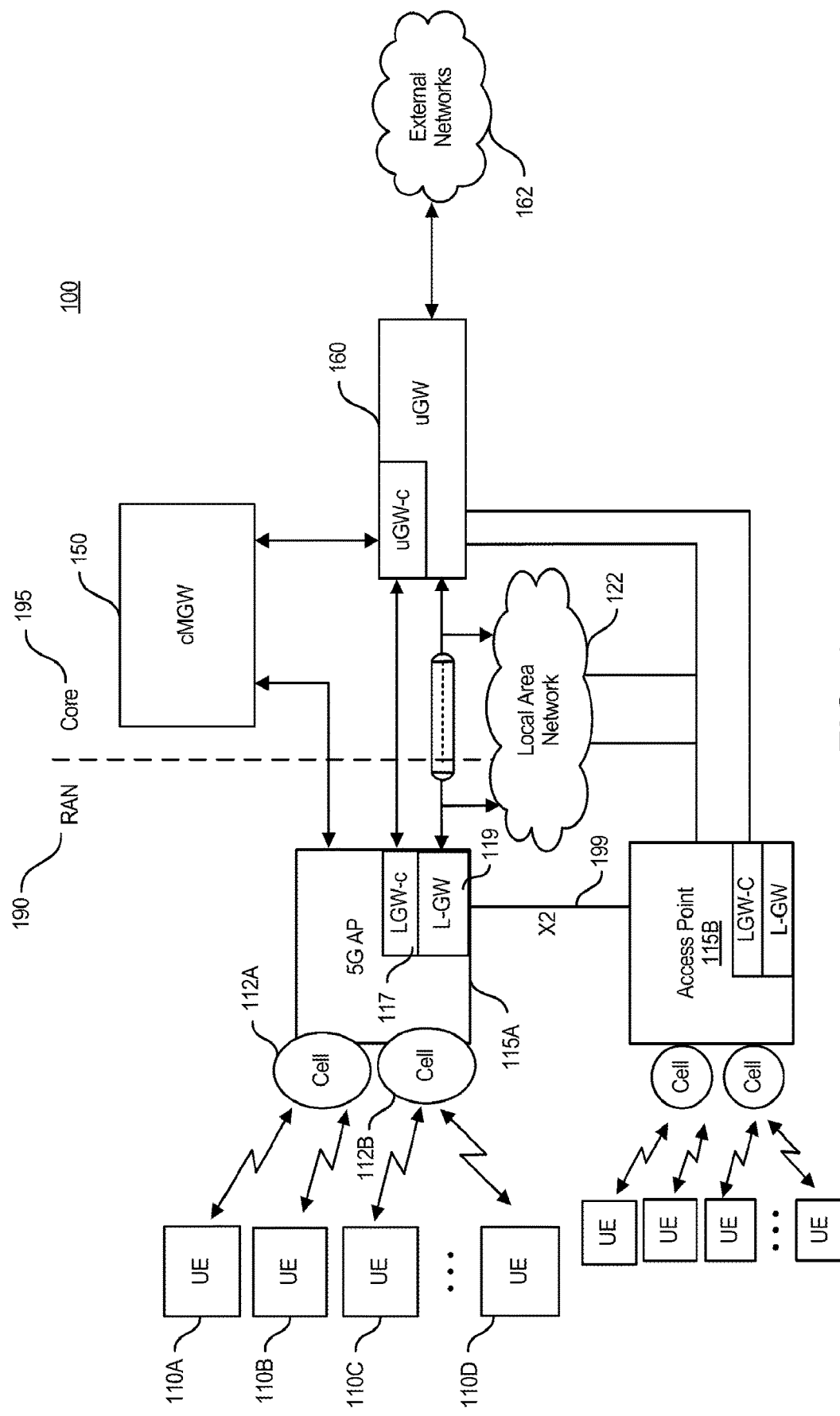
FIG. 1 depicts an example of a system including local routing and mobility, in accordance with some example embodiments.

Like labels are used to refer to same or similar items in the drawings.

DETAILED DESCRIPTION

The cellular networks of today may be considered highly centralized and hierarchical, forcing user traffic to traverse up to a core in the network where nodes, such as centralized mobility anchors and the like, are deployed to support mobility. However, this centralized core mobility approach may be vulnerable with respect to providing a single point of failure. Moreover, this centralized core mobility approach may yield sub-optimal routing paths among certain communicating user equipment. Indeed, as future wireless networks including 5G mobile wireless networks evolve, networks should be more flexible by for example relaxing the constraint of binding user traffic to a single central core anchor, allowing services to be located closer to the end users, and/or providing an optimal shortest path routing between the communicating peers. Some services such as vehicle-to-vehicle and other low latency services may demand these evolutionary features.

The 5G Forum (http://www.5gforum.org/eng/main/) issued a white paper for "5G vision, requirements and enabling technologies." With respect to a distributed architecture, the white paper calls for a 5G core network to support a distributed network architecture that can accommodate larger amounts of traffic. Moreover, the IETF's Distributed Mobility Management (DMM, http://datatracker.ietf.org/wg/dmm/charter/) working group seeks to have user equipment (or mobile node in 5G parlance) that can select its optimal, local IP point of attachment. This may replace the traditional centralized mobility anchoring paradigm, as noted above, where a centralized home agent (HA) serves as a default gateway. As such, a more flat and flexible mobility architecture may be realized that allows traffic between user equipment to take a more optimal route by exploiting different distributed gateways for traffic with different connectivity and mobility requirements.

In some example embodiments, there is provided distributed mobility management that includes localized routing for user equipment.

FIG. 1 depicts an example of a network 100, such as a 5G cellular network, in accordance with some example embodiments. The network 100 may include a radio access network 190 and a core network 195.

Although some of the examples herein refer to 5G and certain protocols, such as the IPv6 protocol, these are merely illustrative examples as other types of cellular/wireless networks and protocols may be used as well.

The radio access network 190 may further include one or more user equipment 110A-D (also referred to as mobile nodes) in coverage areas (also referred to as cells) 112A-B served by a access point 115A (labeled 5GAP), such as a base station. The access point represents a wireless access point which may be under the control of the cellular network and provide a coverage area. Moreover, the access point 115A may support one or more radio access technologies including cellular, WiFi, and/or other radio technologies. The access point 115A may include a local gateway control plane 117 (labeled, LGWc) and a local gateway user plane 119 (labeled, L-GW). The local gateway control plane 117 and a local gateway user plane 119 are collectively referred to herein as a distributed, local gateway 117/119 (or local gateway for the sake of brevity).

Radio access network 190 may include one or more other access points, such as access point 115B, serving one or more other user equipment as well.

The core network 195 may include a controlling mobility gateway 150 (labeled cMGW) and a user-plane gateway 160 (labeled uGW, also referred to herein as "user gateway"). User gateway 160 may also serve as a border gateway providing access to other external networks 162 (for example, the Internet) and services and the like available via external networks 162. Moreover, the user-plane gateway 160 may serve as a tunnel end point for user plane traffic to an access point.

The local area network 122 may include one or more services (for example, one or more servers providing the services locally to the user equipment 110A-D). For example, the local area network 122 may include a service providing vehicle-to-vehicle services for local user equipment 110A-D.

In some example embodiments, radio access network 190 may provide IP access, such as IPv6 mobile broadband access, and include distributed local gateways, such as local gateway 117 and/or 119. Each of the distributed, local gateways 117/119 may serve a local or regional IP and/or IPv6 network, such as local area network 122, to allow services to be located closer to the users, such as user equipment 110A-D. Moreover, the distributed local gateways 117/119 may also provide localized, optimal routing and mobility among user equipment.

In some example embodiments there may be provided inter-access point handovers, such as between access point 115A and access point 115B via an access point to access point interface, such as X2-like interface configured with the X2 access protocol (X2AP), in accordance with some example embodiment. This X2 interface may represent a 3GPP interface, or 3PPP-like interface, between base stations, but augmented to include the localized routing features disclosed herein. An example of an X2 interface is described in 3GPP TS 36.420, Evolved Universal Terrestrial Radio Access Network (E-UTRAN); X2 general aspects and principles.

Although some of the examples refer to the X2 interface, other access point to access point interface types providing mobility management, local handover support, and/or local routing may be used as well.

Controlling mobility gateway 150 may, in accordance with some example embodiments, be a controlling entity for the served user equipment including for example user equipment 110A-D and the like. The user equipment may be implemented as mobile nodes (for example, 5G mobile nodes) configured with Proxy Mobile IPv6, PMIPv6, although other types of nodes/user equipment and protocols may be used as well. Controlling mobility gateway 150 may also control in some respects user equipment access, quality of service, mobility, and/or localized routing for all of the user equipment in the radio access network 190. Controlling mobility gateway 150 may, in accordance with some example embodiments, configure, or enable, localized routing at user-plane gateway 160. This configuration may have a granularity of per served user equipment, the user equipment's location, and a consumed service based on the user equipment subscription data.

User-plane gateway 160 may, in accordance with some example embodiments, implement a local mobility agent (LMA) function to support for example localized routing and/or mobility including mobility protocols such as proxy mobile IPv6. For example, the local mobility agent function may also be provided by the local distributed gateway 117/119. The local gateway 117/119 may, in accordance with some example embodiments, implement a mobile access gateway (MAG) function to support mobility and/or localized routing. Alternatively or additionally, the MAG may be a separate entity to the access point as well. Moreover, the mobile access gateway function may be configured in accordance with PMIPv6 to provide mobility and/or localized routing to user equipment, such as user equipment 110A-D and the like. The MAG may manage the mobility-related signaling for a coupled user equipment (for example, the MAG may track the user equipment's movements and provide signaling for a local mobility anchor). RFC 5213 describes PMIPv6 and describes one or more functions which may be provided by a MAG. Examples of LMA operations may be found in RFC 6705, PMIPv6 Localized Routing.

Although FIG. 1 depicts distributed local gateway 117/119 (including the mobile access gateway function) at access point 115A, the local gateway 117/119 may be implemented at a separate device as well.

In some example embodiments, local distributed gateway 117/119 (which may include a mobile access gateway function) may detect whether any served user equipments 110A-D can be locally routed. When local routing is a candidate, local gateway 117/119, at access point 115A, may manage the localized routing, in accordance with some example embodiments. For example, if user equipment 110A and user equipment 110B are both served by access point 115A, there may be an opportunity to locally route the traffic from user equipment 110A-B at access point 115A including local distributed gateway 117/119. When this is the case, local gateway 117/119 may manage the local routing and mobility for these two user equipment. Alternatively or additionally, local gateway 117/119 may send a notification to indicate to the controlling mobility gateway 150 that user equipment 110A-B are being routed locally.

In some example embodiments, access points 115A-B including local gateway 117/119 may further include an inter-access point interface 199 (labeled X2). This interface 199 may be used by the access points to transfer data associated with local routing and mobility of the user equipment. Examples of the transferred data include context data for a user equipment (which is being handed over), context data for the access point context (which is being served by the user equipment being handed over), mobility access gateway context data (for example, for a PMIPv6 client), temporary data forwarding in the inter-AP handover, localized routing entries (LRE), and/or the like. The transferred data may also include local routing entries.

In some example embodiments, the localized routing, such as PMIPv6 localized routing at the local gateway 117/119 performing the MAG function, may operate over the access point to access point interface (for example, an X2 or other like interface).

Figure 2A:
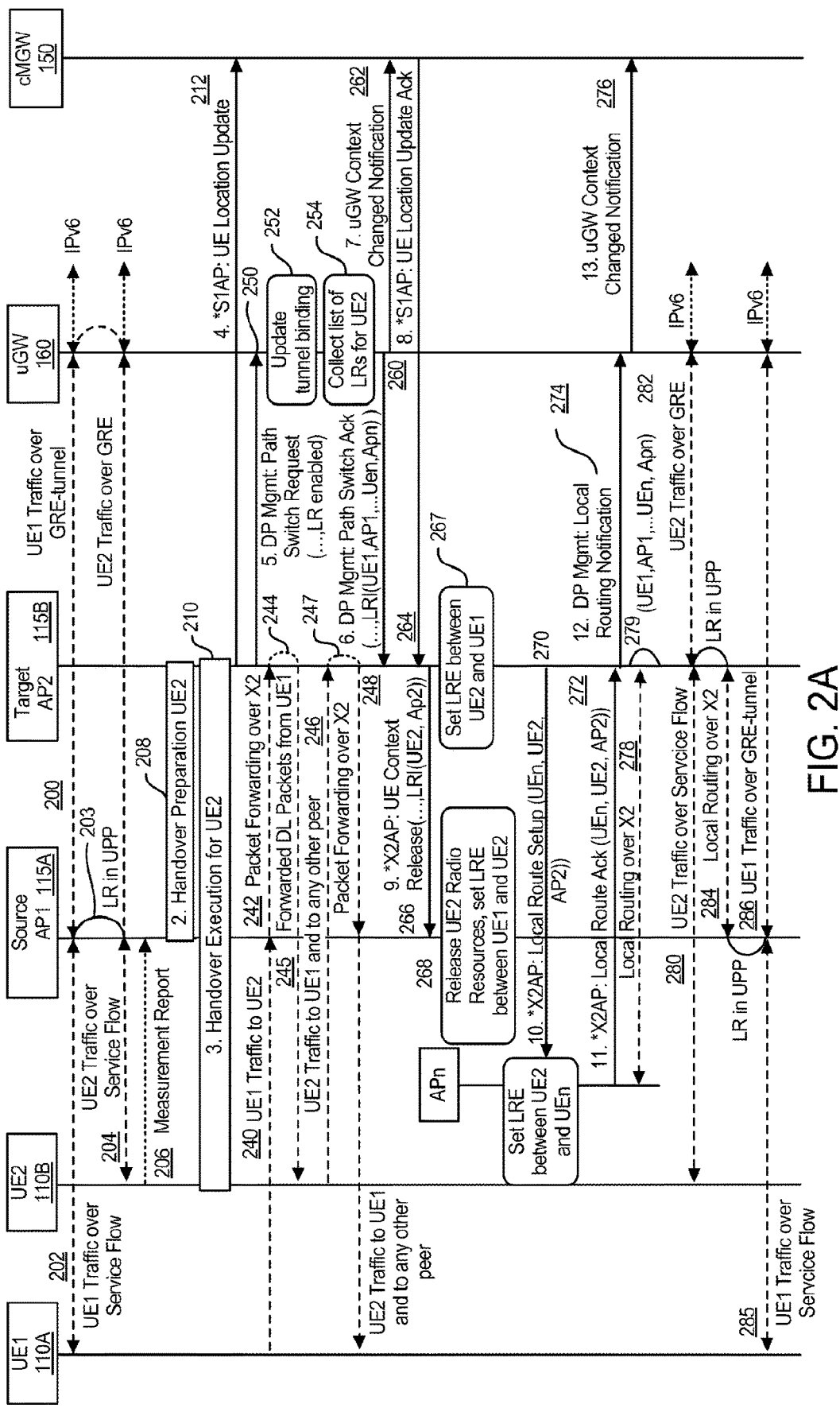
FIG. 2A depicts an example of a process for local routing and mobility, in accordance with some example embodiments.

FIG. 2A depicts an example process 200 for localized routing, in accordance with some example embodiments. The description of FIG.2A also refers to FIGS. 1 and 2B.

In the example of FIG. 2A, process 200 may include a handover from a first access point 115A to a second access point 115B with localized routing supported via a local interface (for example, the X2 interface), in accordance with some example embodiments.

Although some of the examples refer to the X2 interface, this is merely an example as other types of access point to access point interfaces may be used as well.

Figure 2B:
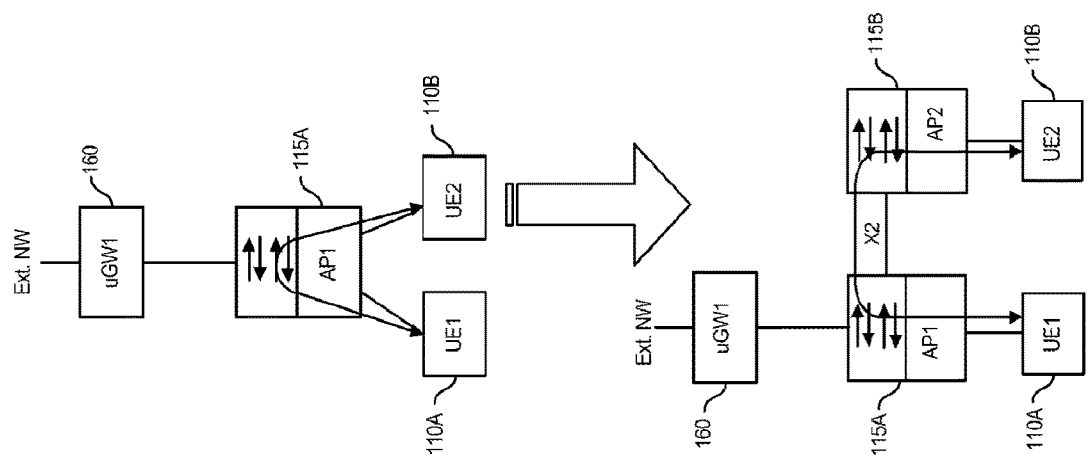
FIG. 2B depict a block diagram showing a mobile user equipment, in accordance with some example embodiments.

FIG. 2B depicts user-plane gateway 160 coupled to access point 115A serving two user equipment 110A-B locally routed by access point 115A via for example the local gateway 117/116, in accordance with some example embodiments. In the example of FIG. 2A-B, user equipment 110B may be mobile and couple to access point 115B, so a handover process may be performed in accordance with FIG. 2A to complete the handover via the local interface 199 between access points 115A and 115B.

At 202-204 (FIG. 2A), there may be a local routing instance 203 between user equipment 110A and user equipment 110B supported locally by the access point 115A. The local routing may be established in the data packet switch function of access point 115A. Traffic that is not part of the local routing may traverse to user-plane gateway 160.

At 206, user equipment 110B may send a measurement report to access point 115A. The measurement report may indicate a need for a handover of user equipment 110B from access point 115A to access point 115B.

At 208, a handover preparation phase may be initiated for user equipment 110B. As part of handover preparation at 208, context may be provided to the target access point 115B. This context data may represent data the user equipment to access point context data for user equipment 110B. For example, the context data may include IP address information for the user equipment 110B to access point 115A connection and local routing entries for user equipment 110B. The local routing entries may indicate which other user equipment are participating in local routing with user equipment 110B (which in this example is user equipment 110A). Moreover, source access point 115A may send the context data and local routing entries to the target access point 115B via a local interface 199, such as an X2 like interface as noted. Moreover, access points 115A-B may exchange, via the local interface 199, tunnel endpoint addressing information in order to establish a tunnel, such as a user equipment-specific 110B bi-directional tunnel over for example an X2 user plane interface.

If the handover to target access point 115B is accepted, the radio handover execution may be performed at 210. For example, source access point 115A may initiate a handover of user equipment 110B based on the measurement report 206. When the handover is executed at 210, source access point 115A may initiate forwarding, at 240-245, of data packets destined to the user equipment 110B over the newly established tunnel at 199 to target access point 115B. The forwarded data packets may be buffered in the target access point 115B until user equipment 110B obtains radio link connectivity to the target access point 110B. After the radio link is established, data traffic between user equipment 110A and 110B may be routed, at 246-248, via the X2 tunnel 199 between the involved access points 115A-B.

At 212, the target access point 115B may send to the controlling mobile gateway 150 a location update message for user equipment 110B (which is being handed over in this example). This location update message may exclude the path switching information for the user equipment 110B (which is being handed over) and any services consumed via the user-plane gateway 160. In some example embodiments, tunnel switching may be performed by the user-plane entities, such as the uGW/LMA and access point/MAGs via in-band signaling.

In some example embodiments, the target access point may send, at 250, a path switch request message directly to user gateway 160. This path switch request message may be sent in accordance with a data path management protocol. In some example embodiments, the path switch request message may include an indication that local routing is enabled at the target access point 115B. In some example embodiments in which PMIPv6 is implemented, upon reception of a proxy binding update (PBU, which may be in accordance with for example RFC 5213) message from the access point 115A to establish, modify, or release a UE-specific PMIPv6 controlled tunnel, the user-plane gateway 115A may verify (1) whether localized routing is enabled/disabled for the UE, (2) existing localized routing entities with other UEs, and/or (3) possible new LREs (when localized routing is enabled). Based on these verifications, the uGW/LMA may decide whether to implement localized routing and, if so, may issue any localized routing initializations (LRIs) to any involved 5GAP/MAGs accordingly. The uGW/LMA may also send a notification message to the cMGW 150 in order to keep it up to date about the mobility and the localized routing related events. Alternatively or additionally, the 5GAP/MAGs may send their PBU messages to a centralized DMM controller, such as the cMGW, which may also control the uGW/LMAs.

At 252, user gateway 160 may update the tunnel bindings. Moreover, user gateway 160 may also collect, at 254, a list of local routing entries for user equipment 110B. This list may include each user equipment that user equipment 115B has a local route to. The local routing entries may include a user equipment's IP address and the IP address of the user equipment's serving access point in order to setup a tunneled host route.

In some example embodiments, the user gateway 160 may send, at 260, a path switch acknowledge message to target access point 115B. This acknowledgement message may include local routing information (for example, the list of local routing entries including user equipment IP addresses and access point addresses). In its UE-specific Proxy Binding Acknowledge (PBA) message to the 5GAP/MAG, the uGW/LMA (or cMGW) may include the LRI (Local Routing Initialization) message(s) for this UE as a part of the PBA message. This may allow for the configuration of LREs (local routing entries) at least in the receiving 5GAP/MAG (which may lead to a reduced quantity of message transactions in the uGW/LMA, or in the cMGW accordingly). In case the PBA message (sent at 260) is included in an LRI message destined to other 5GAP/MAG to configure LRE, the receiving 5GAP/MAG, on behalf of the LMA, may forward the LRI message over the existing X2 interface to the other 5GAP/MAG by encapsulating LRI into a X2AP message.

At 262, user-plane gateway 160 may send a user gateway context changed notification message to the controlling mobility gateway 150. Based on this message, controlling mobility gateway 150 may be able to verify that the user-plane tunnel from access point 115B to user gateway 160 is switched according to the new location of the user equipment 110B.

At 264, controlling mobility gateway 150 may send a user equipment location update acknowledge message to target access point 115B. This may verify to the access point 115B that the controlling mobility gateway 150 has switched control-plane connectivity to the new, target access point 115B serving user equipment 110B.

In some example embodiments, target access point 115B may send, at 266, a user equipment context release message to the source access point 115A, but this context release message (or other message type) may also include the local routing indication information for any user equipment that the user equipment 110B has established local routing. For example, message 266 may include all the local routing indication information, such as IP addresses for the UEs, access points, and the like, for UEs served by access point 115A that have established local routing with UE 110B. The local routing indication information may be sent separately, via for example the X2-like access point to access point interface, to each access by the uGW so we can reduce the signaling load between AP-uGW links. In some example embodiments, the uGW may thus sends the LRIs to AP 115B in for example a PBA message, and AP 115B may then send the messages to each AP via X2-like interface.

At 268, source access point 115A may, in response to message 266, release user equipment 110B's resources and/or configure local routing entries to setup local routing for any user equipment (served by access point 115A) having local routing with user equipment 110B. At 267, target access point 115B may configure local routing entries to setup local routing at access point 115B for user equipment 110B, as well as any user equipment (which are served by access point 115B) having local routing active/enabled with user equipment 110B.

In some example embodiments, the target access point 115B may send, at 270, to at least one access point at least one local route setup message. The local route set up may be sent via local access point to access point interfaces (for example, an X2 like interface 199) to some (if not all) access points as other user equipment (which may have local routing with user equipment 110B) may be served in other access points. In some example embodiments, the local route setup message may include the local routing entries received from user gateway 160 for user equipment 110B. If local routing updates are not delegated to the access point, then the user gateway may send the local routing updates to other access points.

In some example embodiments, access point 115B may receive, at 272, an acknowledgement message for the message sent at 270. For example, an access point local route acknowledgement message may be received at 272. Furthermore, the access point local route acknowledgement message may be received via an access point to access point interfaces (for example, an X2 like interface 199). Moreover, the access point local route acknowledgement message may be in accordance with the X2 access protocol (X2AP), although other protocols may be used.

At 274, access point 115B may send management messages, such as data path management message(s), to user gateway 160 in order to indicate that local routing entries have been modified. The 5GAP/MAG may send their localized routing acknowledgement (LRA) messages directly to the uGW/LMA (or to a centralized DMM controller if used in the network) as they are not time critical when compared with the radio handover related signaling. For example, the management message 274 may include a local routing notification for user equipment 110B (which is being handed over). At 276, user gateway 160 may send to controlling mobility gateway 150 a context changed notification message in order to keep the controlling mobility gateway updated with respect to local routing. If the uGW/LMA (or the centralized DMM controller) does not receive a LRA message response from a 5GAP/MAG in time, the LRI message(s) may be resent directly to the 5GAP/MAG. In this way the LR management can operate reliably in the face of occasional failures.

At 278-280, traffic may flow for locally routed traffic over X2-interface (at 279) for UE 110B and any other UEs served by other access points. At 280, some of the traffic may include traffic that is not locally routed but forwarded at 282 to uGW 160. Moreover, 280-284-285 depicts an example where data is routed locally over X2-interface between UEs 110A and 110B. At 286, some of the non-local traffic may be routed to uGW 160.

Figure 3A:
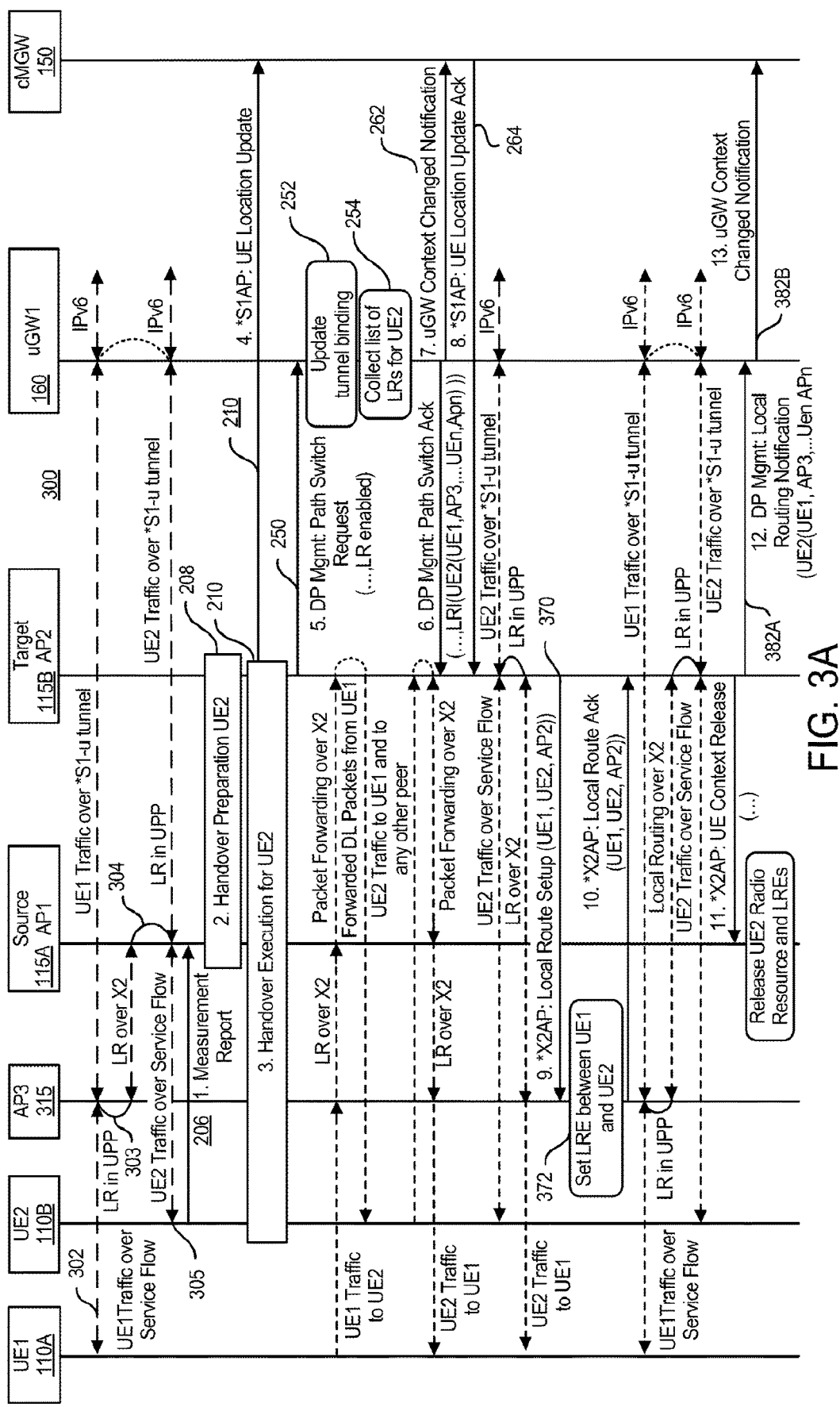
FIG. 3A depicts another example of a process for local routing and mobility, in accordance with some example embodiments.

FIG. 3A depicts another example process 300 for localized routing, in accordance with some example embodiments. The description of FIG. 3A also refers to FIGS. 1 and 3B.

Figure 3B:
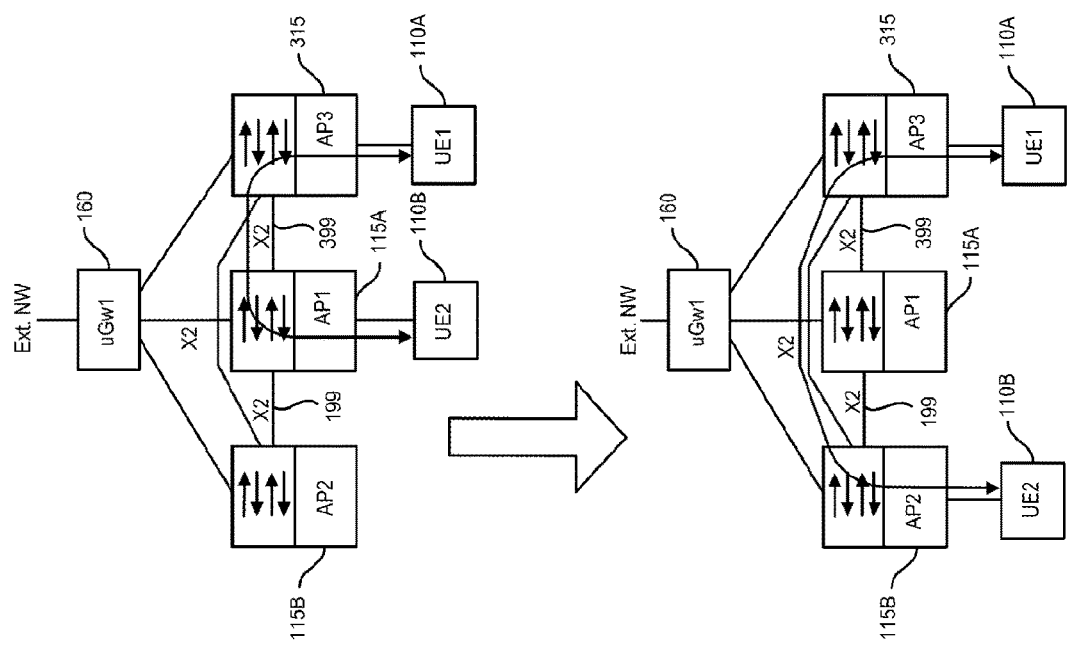
FIG. 3B depict another block diagram showing a mobile user equipment, in accordance with some example embodiments.

In the example of FIGS. 3A-3B, the process 300 may include a handover from a first access point 115SA to a second access point 115B with localized routing supported via a local access point to access point interface, such as an X2-like interface. In the example of FIG. 3B, user equipment 110A-B may have established local routing via access points 115A and 315. User equipment 110B is, however, mobile and, as such, couples to access point 115B, so a handover process 300 may be performed in accordance with FIG. 3A to complete the handover via the local interfaces 199 and 399. Unlike the example of FIG. 2B, in FIG. 3B an intermediary access point 115A is involved in the local routing after the handover.

At 302-305, localized routing may be provided at access point 315 and access point 115A to provide traffic flow between user equipment 110A and 110B. At 306, user equipment 110B may send a measurement report to the source access point 115A. This report may trigger a handover decision which may lead to a handover decision at 308 and handover execution at 310. At 312, a location update message for user equipment 110B may be sent to controlling mobility gateway 150. The location update message may be sent in accordance with the S1 Application Protocol (S1AP), although other protocols may be used as well. For example, data path switching may be performed at user gateway 160 in accordance with SLAP as shown (see, for example *S1-u tunnel), and the signaling for the switching may be performed out of band. An example of an S1AP protocol is described at 3GPP TS 36.413—Evolved Universal Terrestrial Radio Access Network (E-UTRAN); S1 Application Protocol (S1AP).

In the example of FIG. 3A, controlling mobility gateway 150 may be considered the decision maker with respect to local routing. For example, the controlling mobility gateway 150 may collects, at 352, a list of local routing for user equipment 110B, and may return, at 364, the local routing control messages in the SLAP user equipment location update acknowledgement message to the target access point 110B.

At 370, the target access point 115B may send a local route setup message to other access points, such as access point 315, to established local routing. Next, access point 315 may establish local routing, at 372, to enable local routing between user equipment 110A (which is served by access point 315) and the target access point 115B (which is serving user equipment 110B). For example, target access point 115B may configure local routing entities for user equipment 110B, and may update, at 370, the possible local routing entries in the other access points, such as access point 315. This update at 370 may be performed over an access point to access point interface such as interfaces 199 and 399.

When all the local routing entries are configured, target access point 115B may send the local routing notification message (382A) to user gateway 160 which may forward a context change notification message 382B to the controlling mobility gateway 150 in order controlling mobility gateway keep it up-to-date with the local routing status.

In some example embodiments, the local X2-like interface, such as interface 199, 399, and the like, may be used to carry temporary tunnel establishment information during the inter access point handovers and carry local routing.

In some example embodiments, the target access point (where the mobile user equipment moves to during the handover, for example) may receive information about local routing entries for that "mobile" user equipment. Moreover, the target access point may update at least one other access point with local routing entries associated with the mobile user equipment.

In some example embodiments, upon reception of a proxy binding update (PBU) message from the access point 115A to establish, modify, and/or release a user equipment-specific PMIPv6 controlled tunnel, the user gateway 160 may verify (1) whether localized routing is enabled/disabled for the mobile user equipment (for example, user equipment 115B in handover), (2) existing localized routing entries (LREs) among the mobile user equipment and any other user equipment, and/or (3) checks, when localized routing is enabled, the possibility of new localized routing entries due to the handover. Based on at least these verifications, the user gateway 160 may make decisions about localize routing, and the user gateway 160 may send a message to update any other access points that may need to have their localized routing entries updated. The user gateway 160 may also send a notification message to the controlling mobility gateway 150 in order to keep it up to date regarding the mobility and localized routing related events. Alternatively or additionally, the access point may send the PBU message(s) to a centralized DMM controller (for example, a controlling mobility gateway 150) that also controls the user gateway 160.

In some example embodiments, the controlling mobility gateway 150 may check each mobility event message(s) (which are associated with the localized routing) sent from the user gateway 160. Based on this check of received information, the controlling mobility gateway 150 may decide to re-configure, when needed, localized routing related configuration data in the user gateway 160 and/or an access point.

In some example embodiments, the user gateway/local mobility agent (or controlling mobility gateway) may include the LRI (local routing initialization) message(s) for a given user equipment in the user equipment specific proxy binding acknowledge (PBA) message sent to the access point. Moreover, this may enable configuration of local routing entries at least in the receiving access point. In some implementations, this may reduce the number of message transactions in the user gateway 160 or controlling mobility gateway 150.

In some example embodiments, the PMIPv6 LR protocol may include (or be augmented) to include a service flow parameter and/or a session identifier (Id) parameter to enable local routing on a per user service flow and/or session basis.

When the proxy binding acknowledge message (at for example, 250 and/or 260) may include the LRI message to configure localized routing entries at the other access points, the receiving other access points may, on behalf of the LMA, forward the message over an existing local access point to access point interface (for example, X2 like) to the other access points by encapsulating the LRI with a X2AP message, in accordance with some example embodiments. The other access points (which receive LRI over X2 interface) may be a prior access point which were serving the mobile user equipment. In this way, localized routing (LR) tunnels between the other access point(s) may be managed in conjunction of the existing handover signaling, with minimal signaling transactions (low signaling cost) in the network. As the data forwarding over the X2-like local interface may be supported in the inter-AP handovers on default and the LR between MAGs can be established with help of the enhanced X2 messaging, it may enable low network utilization in user gateway/local mobility agent that otherwise may be become a bottleneck in a LMA domain.

In some example embodiments, the other access points may send a localized routing acknowledgement message(s) directly to the user gateway 160 (or to a centralized DMM controller if used in the network) as these message are not time critical, when compared with the radio handover related signaling. If the user gateway 160 (or the centralized DMM controller such as controlling mobility gateway 160) fails to receive localized routing acknowledgement, the user gateway 160 agent may, in accordance with some example embodiments, re-send a local route initialization message(s) directly to the access point.

Moreover, although some of the terminology may refer to a device or protocol in 3G terms, this is merely for explanatory purposes and not intended to be limiting. For example, the use of user equipment (user equipment) may refer to the mobile node in the parlance of 5G. Likewise, the phrase base station also refers to the 5G access point (5GAP).

Figure 4A:
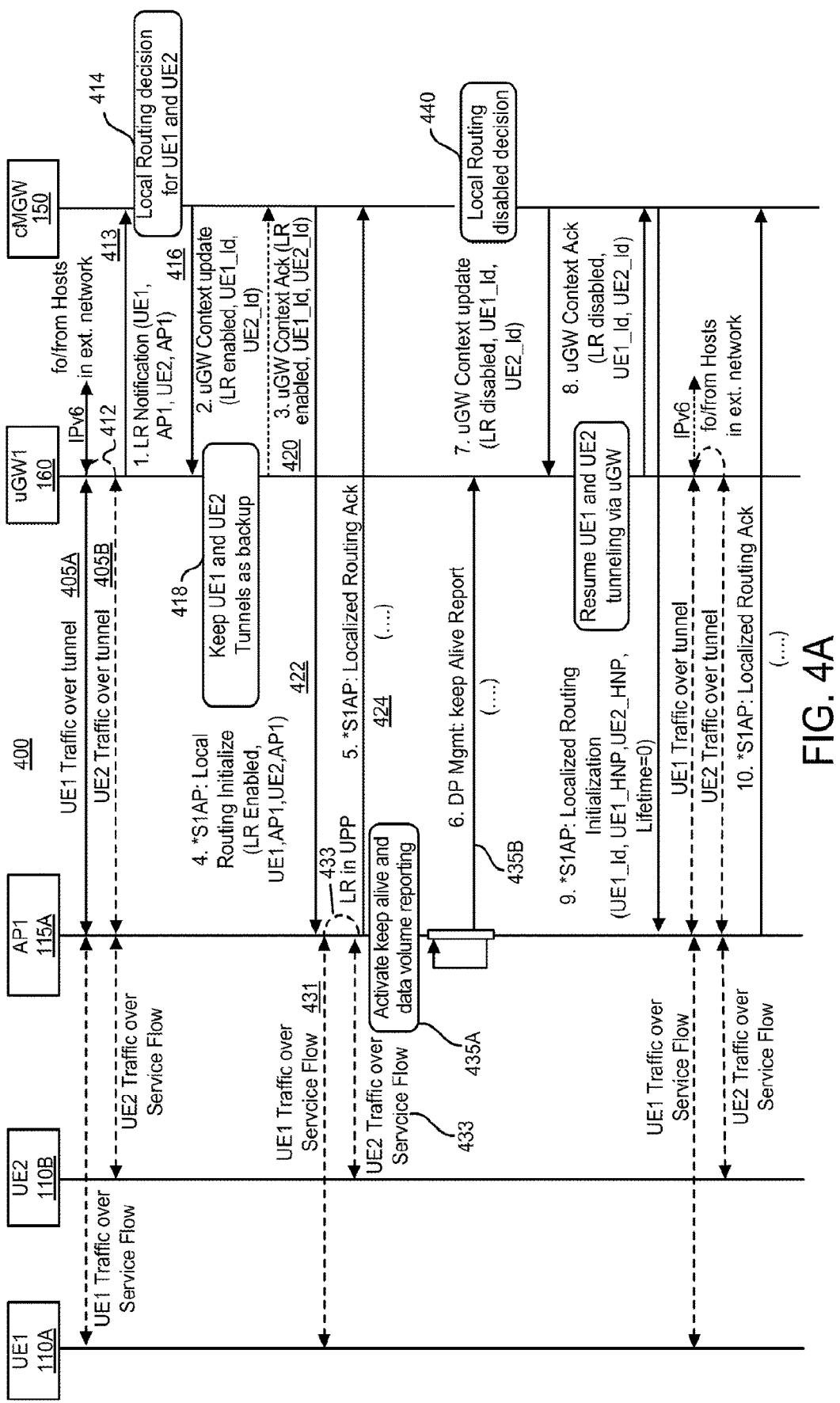
FIG. 4A depicts another example of a process for local routing and mobility, in accordance with some example embodiments.

FIG. 4A depicts an example process 400 for localized routing management, in accordance with some example embodiments. The description of FIG. 4A also refers to FIGS. 1 and 4B.

In the example of FIG. 4A, process 400 may include out-of-band signaling for management and control of the localized routing. In some example embodiments, controlling mobility gateway (cMGW) 150 may manage the configuration of the local routing entries (LREs) at one or more access points (for example, at a packet data switch function therein). The out-of-band signaling may be in accordance with an SLAP protocol, although another core network to radio access point interface protocol may be used as well.

Figure 4B:
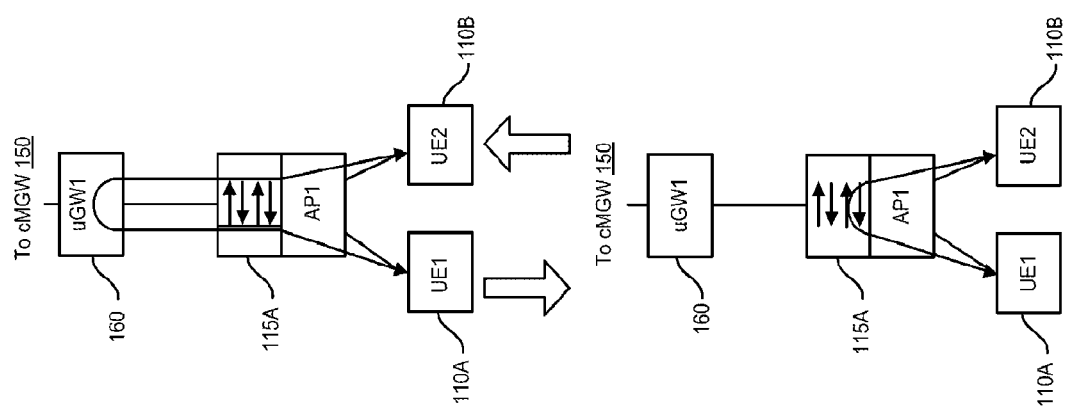
FIG. 4B depict another block diagram showing a user equipment routed locally, in accordance with some example embodiments.

FIG. 4B depicts an initial route (top of FIG. 4B) via the user gateway 160, and then after localized routing is configured and initiated, localized routing (bottom of FIG. 4B) may be performed at the access point 115A among user equipment 110A-B. A core to access point interface, such as an SLAP-like protocol as described further below at 422, may be used to configure local routing entries at the access point to enable the localized routing.

Initially, user equipment 110A-B may, at 405A-B and 412, be operating using the same connectivity service, in which localized routing is enabled. Some user data traffic may be routed via the user gateway 160 (uGW) as for example default routing 412.

When user equipment 110A-B communicate with each other and thus establish an IP session for example, the established session may be detected in user plane nodes of the network, such as at access point 115A, user gateway 160, and/or the like. For example, user gateway 160 may detect that localized routing is enabled at the user equipment 110A-B and that there is a session between them that can be localized. When this is the case, user gateway 160 may send, at 413, a notification to cMGW 150. This notification message at 413 may include the address (for example, identities, IP address, and/or other information) identifying the user equipment and/or access point(s) involved with the localized routing.

In some example embodiments, cMGW 150 may be a localized routing decision maker 414, although the decision may be made by other nodes as well. The control including management of localized routing may be performed out of band by cMGW 150. This out-of-band signaling control may include configuring LREs at the AP 115A as well as other access points having localized routing with one or more of the user equipment 110A-B.

At 416, cMGW 150 may send a context update to notify user gateway 160 that localized routing may be allowed and may be initialized. User gateway 160 may keep, at 418, tunnels 405A-B as for example a backup (or alternatively may tear tunnels 405A-B down). At 420, the user gateway 160 may acknowledge message 416.

In some example embodiments, the cMGW 150 may configure, at 422, access point 115A. This configuration may include localized routing information, such as the IP addresses of the user equipment 110A-B and the like in localized routing (and other access points supporting the localized routing for example). This configuration may be performed via an S1AP protocol, although other core network to access point interfaces may be used as well. The configuration may be considered out-of-band signaling in the sense that cMGW 150 is performing the configuration, rather than user gateway 160. In some example embodiments, access point 115A may, at 424 acknowledge that localized routing is configured and/or established as shown at 431-433.

If there is a need to update quality of service (QoS) policy data in the access point 115A (or the packet data switch therein), this may be performed as well at 422. QoS may pertain to for example communication links, service, and/or application being executed between user equipment 110A-B. To illustrate further, QoS may indicate a maximum packet delay budget, maximum packet error loss probability, and/or any other QoS parameter for the communication between user equipment 110A-B. Moreover, if there are multiple services/applications operating between the user equipment 110A-B, the QoS policy may be the same or different for each service/application.

When the uGW 160 is prepared for localized routing, the local routing entry (LRE) may be configured at the access point 115A. The uGW 160 may also start receiving, at 435, from time to time keep alive messages/reports from the access point that may include data volume reports to enable a continuation of charging functions at the uGW. Moreover, the cMGW may terminate, at 440, localized routing as well.

Figure 5A:
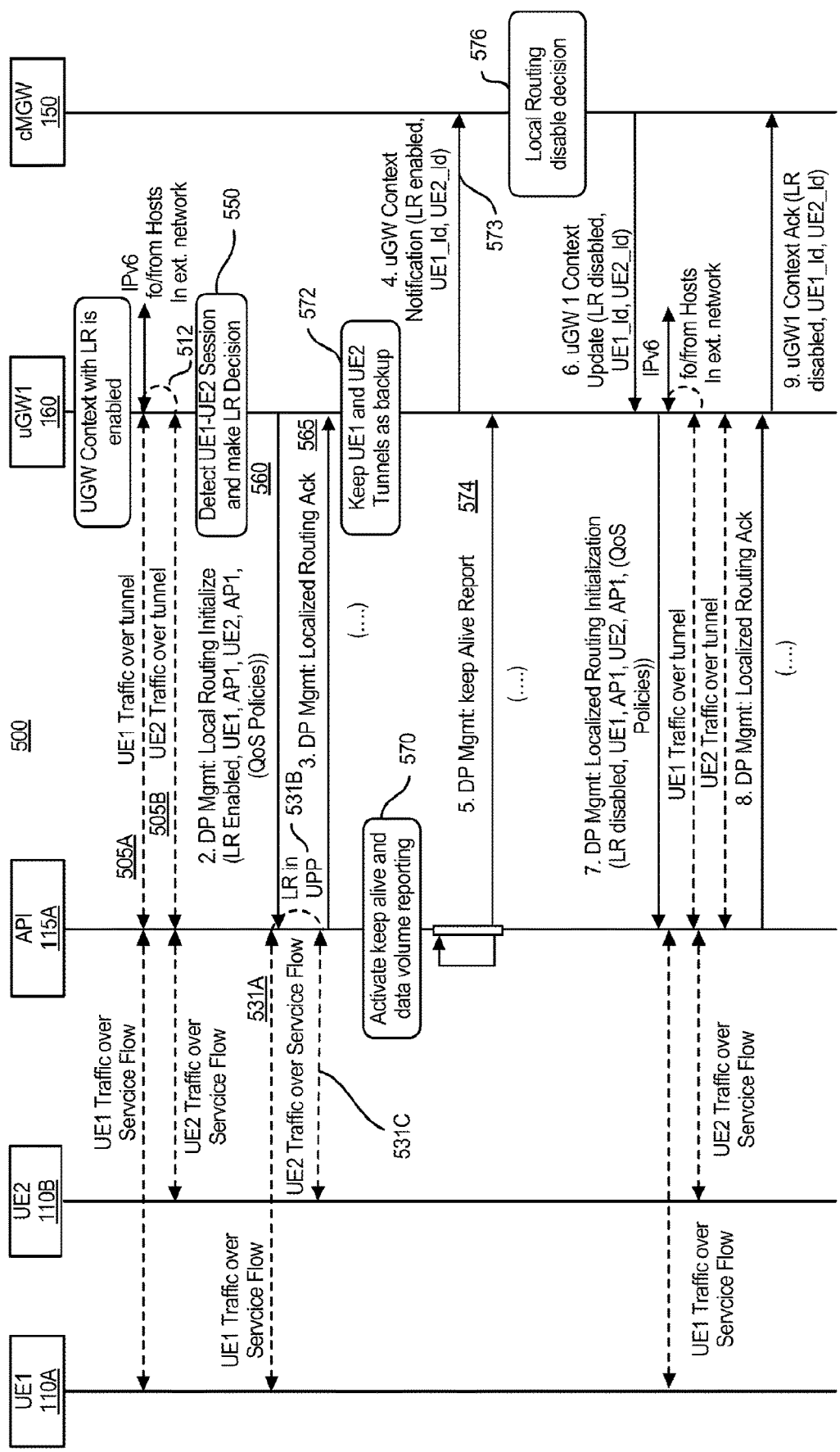
FIG. 5A depicts another example of a process for local routing and mobility, in accordance with some example embodiments.

FIG. 5A depicts an example process 500 for localized routing management, in accordance with some example embodiments. The description of FIG. 5A also refers to FIGS. 1 and 5B.

Figure 5B:
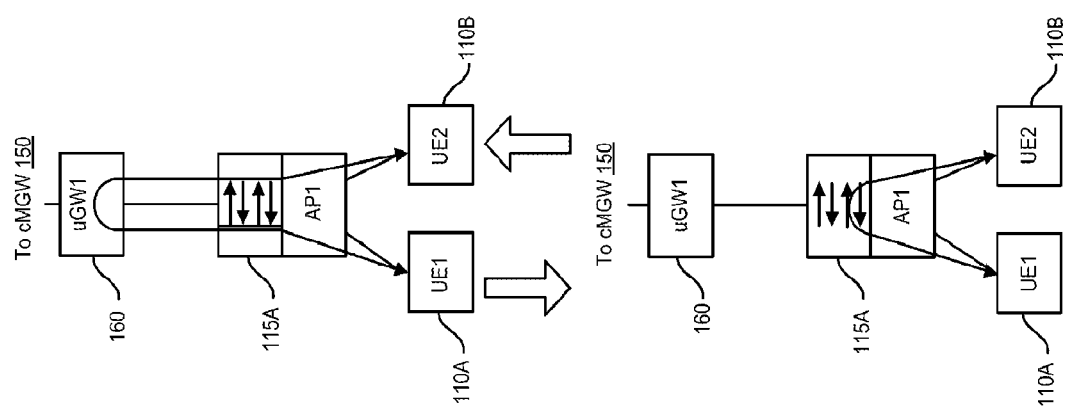
FIG. 5B depict another block diagram showing a user equipment routed locally, in accordance with some example embodiments.

In the example of FIG. 5A, process 500 may include in-band signaling for management and control of the localized routing. In some example embodiments, user gateway 160 may manage the configuration of the local routing entries (LREs) at one or more access points (for example, at a packet data switch function therein). FIG. 5B depicts an initial route (top of FIG. 5B) via the user gateway 160, and then after localized routing is configured and initiated, localized routing (bottom of FIG. 5B) may be performed at the access point 115A among user equipment 110A-B.

In some example embodiments, cMGW 150 may delegate localized routing policies to the uGW 160 (which may serve as a user packet, UP, node), so that user gateway 160 can be allowed to autonomously control localized routing entries at access points using in-band signaling. This control protocol may be considered a data path management protocol.

Like FIG. 4A, user equipment 110A-B may be operating at 505A-B using the same connectivity service, in which localized routing is enabled, and some user data traffic may be routed via the user gateway 160 (uGW) as for example default routing 512. When user equipment 110A-B communicate with each other and thus establish an IP session for example, session established can be detected in user plane nodes of the network, such as at access point 115A, user gateway 160, and/or the like. For example, user gateway may detect, at 550, that localized routing is enabled at the user equipment 110A-B and that there is a session between them that can be localized.

In some example embodiments, user gateway 160 may, at 550, also be decision maker 150 with respect to deciding whether to enable localized routing and control the local routing entries at the access points. This control may be considered in-band in the sense that the user gateway 160 is performing the control, rather than the centralized cMGW 150. Moreover, the uGW 160 may send notifications to the cMGW 150 (see for example, 573 context notification message) about the activated local routes (rather than each IP session) between UEs 110A-B that are allowed to use localized routing.

When the uGW 160 makes the localized routing decision at 550, uGW 160 may keep, at 572, tunnels 505A-B as a backup (or for other reasons), even though data traffic between UE1 and UE2 are not being routed via uGW.

In some example embodiments, uGW 160 may send at 560 a message, such as a data path management message, to the access point 115A (which is in-band) to create localized routing entries for the user equipment 110A-B and any other access points involved with localized routing with user equipment 110A or B. The message at 560 may also identify the addresses of the access points as well. Message 560 may also include QoS policy data to configure QoS at the access point(s), which may be derived from the uGW policies. At 531A-C, the localized routing is activated between user equipment 110A-B via access point 115A. When localized routing is initiated and/or active, access point 115A may send, at 565, an acknowledgement message to the uGW 160. Moreover, access pint may generate, at 570, and send, at 574, keep alive messages reporting to uGW 160. The keep alive messages may report data volume reports to enable charging functions to continue at uGW 160. The cMGW 150 may terminate, at 576, localized routing, although other nodes may terminate as well.

Figure 6:
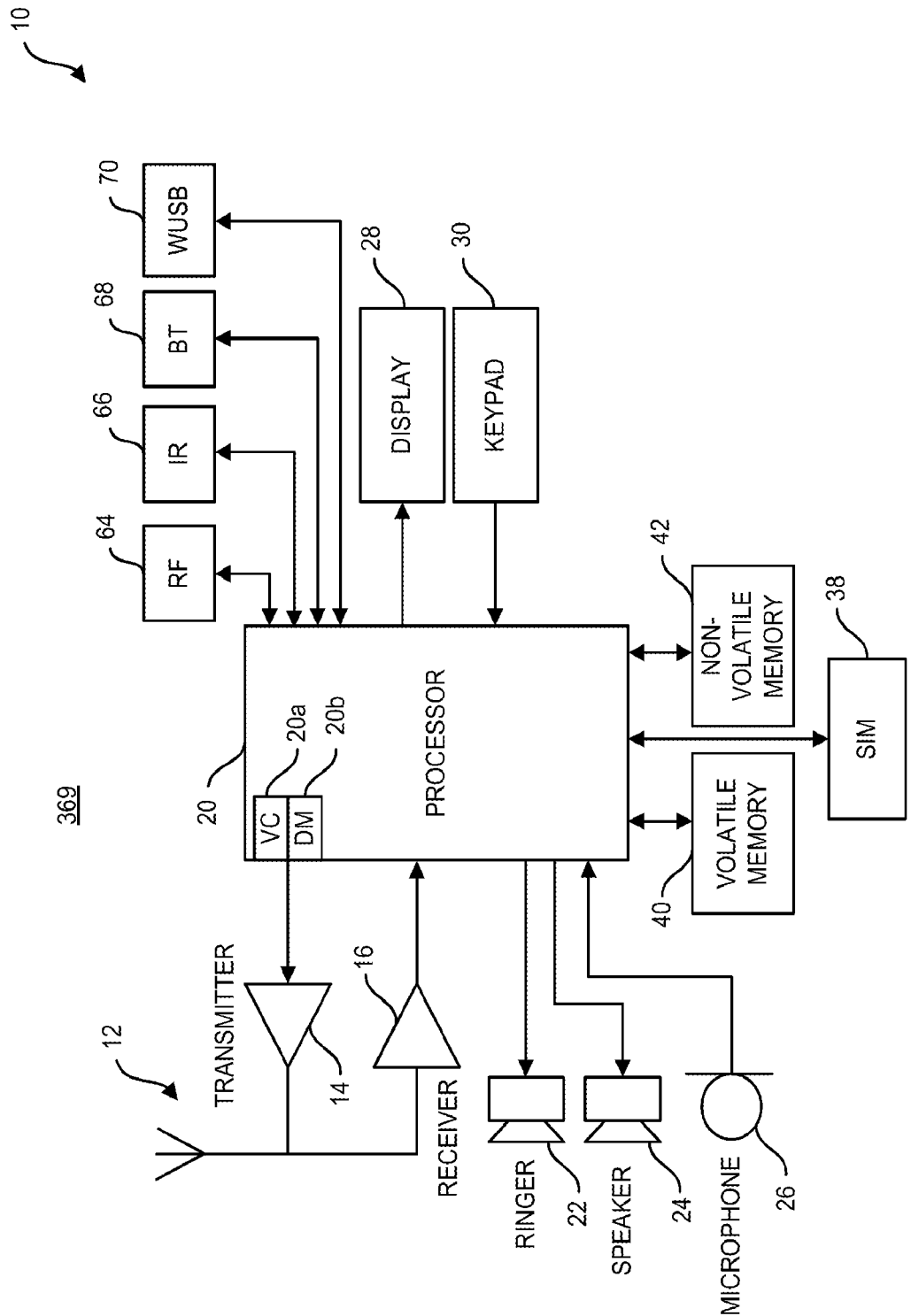
FIG. 6 depicts an example of a user equipment, in accordance with some example embodiments.

FIG. 6 depicts a block diagram of an apparatus 10 such as user equipment, in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or any subsequent revisions or improvements to these standards. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, LTE-Direct, LTE-Unlicensed, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. For example, the PND may provide voice commands to enable voice-guided navigation. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. The apparatus 10 may also include for example short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to provide the operations disclosed herein including process 200, 300, 400, 500 and/or the like. The memories may comprise an identifier, such as an international mobile equipment identification (IMEI) code, capable of uniquely identifying apparatus 10. In the example embodiment, the processor 20 may be configured using computer code stored at memory 40 and/or 42 to perform operations as disclosed herein with respect to process 200, 300, and/or the like. For example, the user equipment may have some of its traffic routed locally at access points and mobility may be similarly handled.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Figure 7:
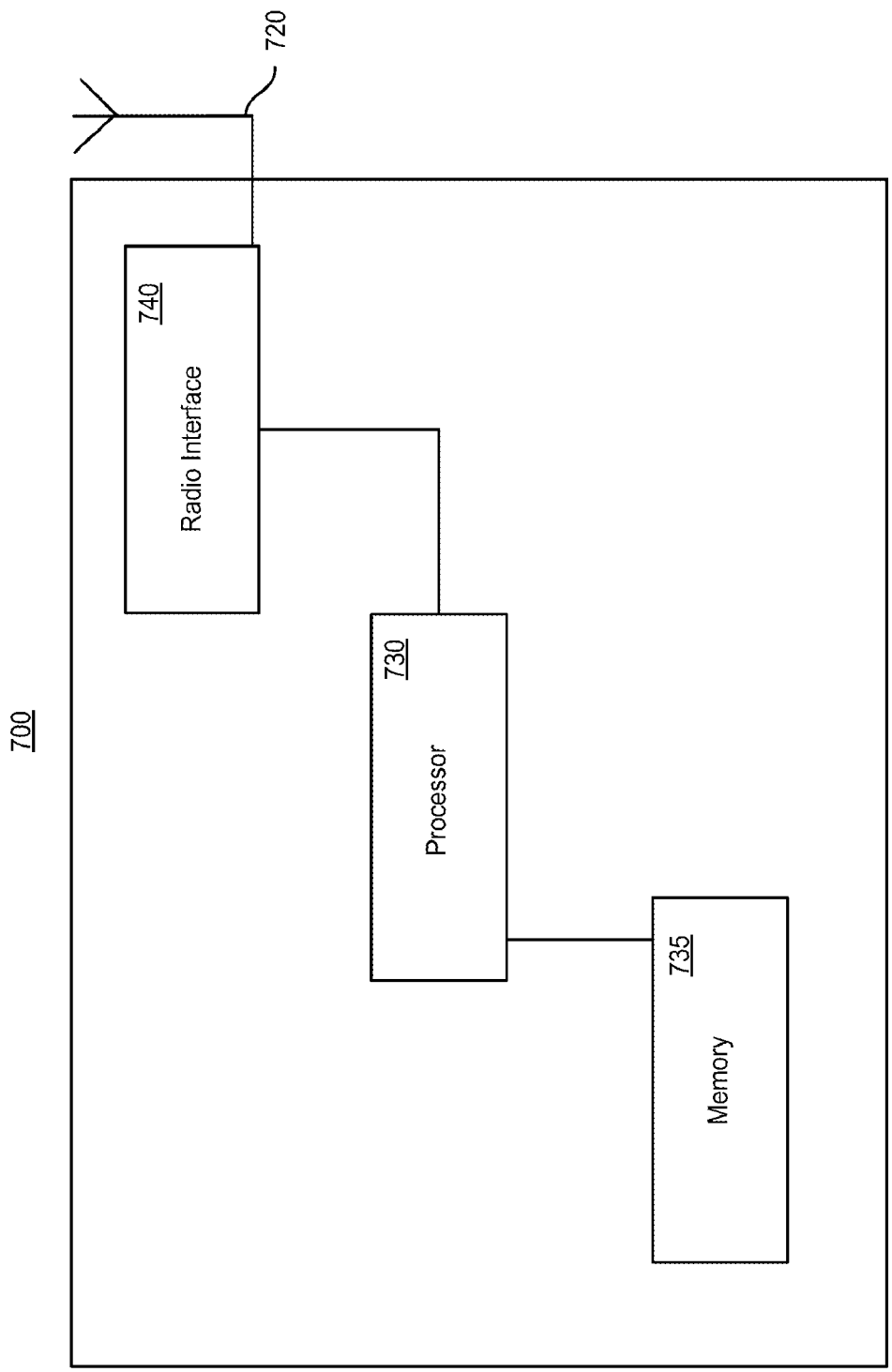
FIG. 7 depicts an example of a network node, in accordance with some example embodiments.

FIG. 7 depicts an example implementation of a network node, such as for example access point 115A, 115B, and/or other nodes in the network including the user gateway and the controlling mobility gateway. The network node 700 may include one or more antennas 720 configured to transmit via a downlink and configured to receive uplinks via the antenna(s) 720. The network node 700 may further include a plurality of radio interfaces 740 coupled to the antenna 720. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 740 may further include other components, such as for example filters, converters (for example, digital-to-analog converters and the like), mappers, a Fast Fourier Transform (FFT) module, and the like, to generate symbols for a transmission via one or more downlinks and to receive symbols (for example, via an uplink). The network node 700 may further include one or more processors, such as for example processor 730, for controlling the network node 700 and for accessing and executing program code stored in memory 735. In some example embodiments, memory 735 includes code, which when executed by at least one processor causes one or more of the operations described herein with respect to network node. For example, network node 700 may receive localized routing context information, send, updated localized routing context information to at least one other base station, and/or other operations (for example, the network node aspects of process 200, 300, 400, 500 and the like) associated with the network node, base station, or access points disclosed herein. In some example embodiments, the network node 700 may include a wired interface. For example, the user gateway 150 and controlling mobility gateway 150 may operate over a wired interface.

Without in any way limiting the scope, interpretation, or application of the claims appearing herein, a technical effect of one or more of the example embodiments disclosed herein may include local decentralized routing and mobility.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. An apparatus comprising:
   at least one processor; and
   at least one memory including computer program code, the at least one memory and the computer program code configured to, with the at least one processor, cause the apparatus to at least:
   receive localized routing context information for a user equipment being served by a radio access network of a source base station, wherein the localized routing context is received from at least one of a local gateway, a user gateway, or a controlling mobility gateway, wherein the localized context routing information includes information about local routing provided between at least one other user equipment that the user equipment has a local route to via the source base station; and
   send updated localized routing context information to at least one other base station, wherein the updated localized routing context information is sent via a local interface between the apparatus and the at least one other base station, the updated localized routing context information includes local routing information for corresponding user equipment routed locally via the apparatus and the at least one other base station.

2. The apparatus of claim 1, wherein the apparatus is further caused to at least send an indication that localized routing is enabled at the apparatus, wherein the apparatus comprises, or is comprised in, a target base station including the local gateway to provide at least in part localized routing, localized mobility, and access to local services, wherein the information includes a first internet protocol address of the at least one other user equipment and a second internet protocol address of a serving base station for the at least one other user equipment in order to setup a tunneled route.

3. The apparatus of claim 2, wherein localized routing context information context is received in response to the indication.

4. The apparatus of claim 2, wherein the apparatus is further caused to at least send a context release message to the source base station that served the user equipment before a handover to the target base station, wherein the context release is sent via a corresponding local interface between the target base station and the source base station.

5. The apparatus of claim 2, wherein the target base station includes the local gateway coupled to a core network node comprising the user gateway.

6. The apparatus of claim 2, wherein the sent updated localized routing context information configures the at least one other base station with user equipment context data and/or target base station context data.

7. The apparatus of claim 2, wherein the apparatus is further caused to at least configure, based on the received context information, the localized routing provided by the apparatus comprised in, or comprising the target base station.

8. The apparatus of claim 7, wherein the apparatus further comprises a mobility access gateway is configured to provide mobility and localized routing in accordance with a proxy mobile internet protocol version six.

9. The apparatus of claim 2, wherein the target base station sends a proxy binding update message to at least one of the controlling mobility gateway or the user gateway.

10. The apparatus of claim 2, wherein the target base station sends a localized routing acknowledgement message to at least one of the controlling mobility gateway or the user gateway.

11. The apparatus of claim 1, wherein the local gateway provides a local mobility agent and/or a mobile access gateway.

12. The apparatus of claim 1, wherein the local gateway is configured in accordance with proxy mobile internet protocol version six.

13. The apparatus of claim 1, wherein the apparatus is further caused to at least collect local routing entries for the user equipment.

14. The apparatus of claim 1, wherein the apparatus is further caused to at least send an acknowledgement message representative that the at least one other base station includes updated localized routing context information for the user equipment.

15. The apparatus of claim 1, wherein the apparatus is further caused to at least receive a proxy binding acknowledgement message including a local routing initialization message for the at least one other user equipment.

16. The apparatus of claim 15, wherein the proxy binding acknowledgement is user equipment specific.

17. An apparatus comprising:
   at least one processor; and
   at least one memory including computer program code, the at least one memory and the computer program code configured to, with the at least one processor, cause the apparatus to at least:
   receive, at the apparatus, an indication that localized routing is enabled for at least one base station serving a user equipment;
   determine, at the apparatus, whether to allow the localized routing; and
   initialize, by the apparatus, the localized routing at the at least one base station serving the user equipment, the localized routing enabling the user equipment to be locally routed to at least one other user equipment via the at least one base station serving the user equipment.

18. The apparatus of claim 17, wherein the initializing is performed via an interface between the at least one base station and the apparatus, wherein the apparatus comprises a controlling mobility gateway.

19. The apparatus of claim 17, wherein the initializing includes providing localized routing context information, wherein the localized routing context information includes information about the least one other user equipment that user equipment has a local route to.

20. The apparatus of claim 17, a wherein the indication is received from a user gateway coupled to the controlling mobility gateway and the at least one base station.

21. A method comprising:
receiving localized routing context information for a user equipment being served by a radio access network of a source base station, wherein the localized routing context is received from at least one of a local gateway, a user gateway, or a controlling mobility gateway, wherein the localized context routing information includes information about local routing provided between at least one other user equipment that the user equipment has a local route to via the source base station; and
sending updated localized routing context information to at least one other base station, wherein the updated localized routing context information is sent via a local interface between an apparatus and the at least one other base station, the updated localized routing context information includes local routing information for corresponding user equipment routed locally via the apparatus and the at least one other base station.

22. The method of claim 21 further comprising: sending an indication that localized routing is enabled at the apparatus, wherein the apparatus comprises, or is comprised in, a target base station including the local gateway to provide at least in part localized routing, localized mobility, and access to local services, wherein the information includes a first internet protocol address of the at least one other user equipment and a. second internet protocol address of a serving base station for the at least one other user equipment in order to setup a tunneled route.

23. The method of claim 22, wherein localized routing context information context is received in response to the indication.

24. The method of claim 22 further comprising:
sending a context release message to the source base station that served the user equipment before a handover to the target base station, wherein the context release is sent via a corresponding local interface between the target base station and the source base station.

25. The method of claim 22, wherein the target base station includes the local gateway coupled to a core network node comprising the user gateway.

26. The method of claim 22, wherein the sent updated localized routing context information configures the at least one other base station with user equipment context data and/or target base station context data.

27. The apparatus of claim 22 further comprising: configuring, based on the received context information, the localized routing provided by the apparatus comprised in, or comprising the target base station.

28. The apparatus of claim 27, wherein the apparatus further comprises a mobility access gateway is configured to provide mobility and localized routing in accordance with a proxy mobile internet protocol version six.

29. The method of claim 22, wherein the target base station sends a proxy binding update message to at least one of the controlling mobility gateway or the user gateway.

30. The method of claim 22, wherein the target base station sends a localized routing acknowledgement message to at least one of the controlling mobility gateway or the user gateway.

31. The method of claim 21, wherein the local gateway provides a local mobility agent and/or a mobile access gateway.

32. The method of claim 21, wherein the local gateway is configured in accordance with proxy mobile internet protocol version six.

33. The method of claim 21 further comprising:
collecting local routing entries for the user equipment.

34. The method of claim 21 further comprising:
sending an acknowledgement message representative that the at least one other base station includes updated localized routing context information for the user equipment.

35. The method of claim 21 further comprising: receiving a proxy binding acknowledgement message including a local routing initialization message for the at least one other user equipment.

36. The method of claim 35, wherein the proxy binding acknowledgement is user equipment specific.

37. A method comprising:
receiving an indication that localized routing is enabled for at least one base station serving a user equipment;
determining whether to allow the localized routing; and
initializing the localized routing at the at least one base station serving the user equipment, the localized routing enabling the user equipment to be locally routed to at least one other user equipment via the at least one base station serving the user equipment.

38. The method of claim 37, wherein the initializing is performed via an interface between an apparatus and the at least one base station, wherein the apparatus comprises a controlling mobility gateway.

39. The method of claim 37, wherein the initializing includes providing localized routing context information, wherein the localized routing context information includes information about the least one other user equipment that user equipment has a local route to.

40. The method of claim 37, a wherein the indication is received from a user gateway coupled to the controlling mobility gateway and the at least one base station.

* * * * *